US008085305B2

United States Patent
Kawaguchi et al.

(10) Patent No.: US 8,085,305 B2
(45) Date of Patent: Dec. 27, 2011

(54) IMAGE PROCESSING APPARATUS, IMAGE SENSING APPARATUS, AND CONTROL METHOD OF IMAGE PROCESSING APPARATUS

(75) Inventors: Zenya Kawaguchi, Tokyo (JP); Yoshihiro Honma, Asaka (JP); Yoshinori Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1213 days.

(21) Appl. No.: 11/755,880

(22) Filed: May 31, 2007

(65) Prior Publication Data
US 2007/0291155 A1 Dec. 20, 2007

(30) Foreign Application Priority Data

Jun. 14, 2006 (JP) ................................. 2006-165365
Aug. 2, 2006 (JP) ................................. 2006-211051
May 15, 2007 (JP) ................................. 2007-129798

(51) Int. Cl.
| H04N 5/228 | (2006.01) |
| H04N 7/18 | (2006.01) |
| H04N 5/222 | (2006.01) |
| G06K 9/00 | (2006.01) |
| G06K 9/46 | (2006.01) |

(52) U.S. Cl. ................. 348/208.4; 348/154; 348/333.12; 382/107; 382/236

(58) Field of Classification Search .......... 348/154–155, 348/208.99, 208.4, 333.01–333.05, 208.6, 348/236; 382/107, 236; 396/52–55
See application file for complete search history.

(56) References Cited

U.S. PATENT DOCUMENTS

| 5,982,912 A | 11/1999 | Fukui et al. |
| 2004/0165754 A1* | 8/2004 | Tabata .......................... 382/118 |
| 2005/0219395 A1 | 10/2005 | Sugimoto |
| 2006/0203109 A1* | 9/2006 | Ono ............................. 348/239 |
| 2007/0140674 A1* | 6/2007 | Nomura et al. ................. 396/52 |

FOREIGN PATENT DOCUMENTS

| JP | 9-251534 | 9/1997 |
| JP | 2005-128156 | 5/2005 |
| JP | 2005-286940 | 10/2005 |

OTHER PUBLICATIONS

M.A. Turk, et al., "Face Recognition Using Eigenfaces", Proc. of IEEE Conf. on Computer Vision and Pattern Recognition, 1991, pp. 586-591.

* cited by examiner

Primary Examiner — Lin Ye
Assistant Examiner — Mekonnen Dagnew
(74) Attorney, Agent, or Firm — Fitzpatrick, Cella, Harper & Scinto

(57) ABSTRACT

An image processing apparatus comprises: a feature detection circuit adapted to detect a feature portion of an object from a sensed image; a blur amount detection circuit adapted to detect a blur amount, during image sensing, of a device adapted to obtain the sensed image; a display unit adapted to display the sensed image, and display a frame surrounding the feature portion of the object in the displayed sensed image; and a calculation circuit adapted to set a position, in the sensed image, of the frame surrounding the feature portion of the object, wherein the calculation circuit calculates, on the basis of the blur amount, a moving amount of the frame whose position in the sensed image is set on the basis of the feature portion detected by the feature detection circuit.

13 Claims, 10 Drawing Sheets

IMAGE PROCESSING APPARATUS, IMAGE SENSING APPARATUS, AND CONTROL METHOD OF IMAGE PROCESSING APPARATUS

BACKGROUND OF THE INVENTION

1. Field of the Invention

The present invention relates to a technique that detects a target object such as the face of an object from a sensed image, and displays a frame surrounding the target object together with the sensed image.

2. Description of the Related Art

Some conventional image sensing apparatuses have a face frame display function of detecting the face area of a person from an image during recording, and displaying a face frame so as to surround the detected face area, thereby allowing the user to recognize a person to be focused on and assisting recording of the person.

Japanese Patent Laid-Open No. 2005-286940 describes a technique that displays a sensed object image on the display screen of a camera, and displays a face frame so as to surround a face image portion detected from the object image, thereby allowing the user to recognize the face image portion detected during recording.

Also, Japanese Patent Laid-Open No. 2005-128156 describes a technique that detects the eye of an object contained in an image during person recording, displays a focusing frame around the detected eye, and controls auto-focusing by using the focusing frame as an in-focus position for use in recording.

Furthermore, as examples of a method of detecting a person's face area, M. A. Turk and A. P. Pentland, "Face recognition using eigenfaces", Proc. of IEEE Conf. on Computer Vision and Pattern Recognition, pp. 586-591, 1991, describes a method using eigenfaces obtained by main component analysis, and Japanese Patent Laid-Open No. 1997-251534 describes a method using feature points such as the eye, nose, and mouth.

Unfortunately, the face detection process described above takes a long time to detect the face area from the sensed image, because the volume of calculation involved is large. When displaying the face frame on the basis of the face detection results, therefore, if a camera shake occurs on the apparatus, as shown in FIGS. 10A to 10C, updating the display position of the face frame is delayed by the time required to detect the face of an image that is moved by the camera shake. Also, especially when an image contains a plurality of faces, the time required for the face detection process further increases.

The method described in Japanese Patent Laid-Open No. 2005-128156 displays a focusing frame to make it possible to readily obtain an image of a person in which the object is focused. However, the focusing frame is based on the result of detection of the object's eye. Similar to Japanese Patent Laid-Open No. 2005-286940, therefore, if a camera shake or the like has moved an image sensing apparatus, updating the display position of the focusing frame is delayed.

SUMMARY OF THE INVENTION

According to the present invention, there is provided an image processing apparatus comprising:

a feature detection circuit adapted to detect a feature portion of an object from a sensed image;

a blur amount detection circuit adapted to detect a blur amount, during image sensing, of a device adapted to obtain the sensed image;

a display unit adapted to display the sensed image, and to display a frame surrounding the feature portion of the object in the displayed sensed image; and a calculation circuit adapted to set a position, in the sensed image, of the frame surrounding the feature portion of the object, wherein the calculation circuit calculates, on the basis of the blur amount, a shift amount of the frame whose position in the sensed image is set on the basis of the feature portion detected by the feature detection circuit.

According to the present invention, there is provided an image processing apparatus comprising:

a feature detection circuit adapted to detect a feature portion of an object from a sensed image;

a blur amount detection circuit adapted to detect a blur amount, during image sensing, of a device adapted to obtain the sensed image;

a display unit adapted to display the sensed image, and to display a frame surrounding the feature portion of the object in the displayed sensed image; and a calculation circuit adapted to set a position, in the sensed image, of the frame surrounding the feature portion of the object, on the basis of the feature portion detected by the feature detection circuit, wherein the display unit erases the frame if the blur amount detected by the blur amount detection circuit is not less than a threshold.

According to the present invention, there is provided an image sensing apparatus comprising:

an image sensing unit;

a feature detection circuit adapted to detect a feature portion of an object from a sensed image obtained by the image sensing unit;

a blur amount detection circuit adapted to detect a blur amount of the image sensing apparatus during image sensing;

a display unit adapted to display the sensed image, and to display a frame surrounding the feature portion of the object in the displayed sensed image; and a calculation circuit adapted to set a position, in the sensed image, of the frame surrounding the feature portion of the object, wherein the calculation circuit calculates, on the basis of the blur amount, a shift amount of the frame whose position in the sensed image is set on the basis of the feature portion detected by the feature detection circuit.

According to the present invention, there is provided an image sensing apparatus comprising:

an image sensing unit;

a feature detection circuit adapted to detect a feature portion of an object from a sensed image obtained by the image sensing unit;

a blur amount detection circuit adapted to detect a blur amount of the image sensing apparatus during image sensing;

a display unit adapted to display the sensed image, and to display a frame surrounding the feature portion of the object in the displayed sensed image; and a calculation circuit adapted to set a position, in the sensed image, of the frame surrounding the feature portion of the object on the basis of the feature portion detected by the feature detection circuit, wherein the display unit erases the frame if the blur amount detected by the blur amount detection circuit is not less than a threshold.

According to the present invention, there is provided a control method of an image processing apparatus comprising a feature detection circuit adapted to detect a feature portion of an object from a sensed image, and a display unit adapted to display the sensed image, and to display a frame surrounding the feature portion of the object in the displayed sensed image, the method comprising the steps of:

detecting a blur amount, during image sensing, of a device adapted to obtain the sensed image;

setting a position, in the sensed image, of the frame surrounding the feature portion of the object, on the basis of the feature portion detected by the feature detection circuit, and displaying the frame; and calculating, on the basis of the blur amount, a shift amount of the frame whose position in the sensed image is set on the basis of the feature portion detected by the feature detection circuit, and displaying the frame.

According to the present invention, there is provided a control method of an image processing apparatus comprising a feature detection circuit adapted to detect a feature portion of an object from a sensed image, and a display unit adapted to display the sensed image, and to display a frame surrounding the feature portion of the object in the displayed sensed image, the method comprising steps of:

detecting a blur amount, during image sensing, of a device adapted to obtain the sensed image;

setting a position, in the sensed image, of the frame surrounding the feature portion of the object, on the basis of the feature portion detected by the feature detection circuit, and displaying the frame; and erasing the frame if the blur amount is not less than a threshold.

Further features of the present invention will become apparent from the following description of exemplary embodiments (with reference to the attached drawings).

DESCRIPTION OF THE EMBODIMENTS

The best mode for carrying out the present invention will be described in detail hereinafter, with reference to the accompanying drawings.

Note that embodiments to be described below are examples for implementing the present invention and hence should be appropriately corrected or changed in accordance with the arrangements of apparatuses to which the present invention is applied and with various conditions, so the present invention is not limited to the following embodiments.

First Embodiment

Figure 1:
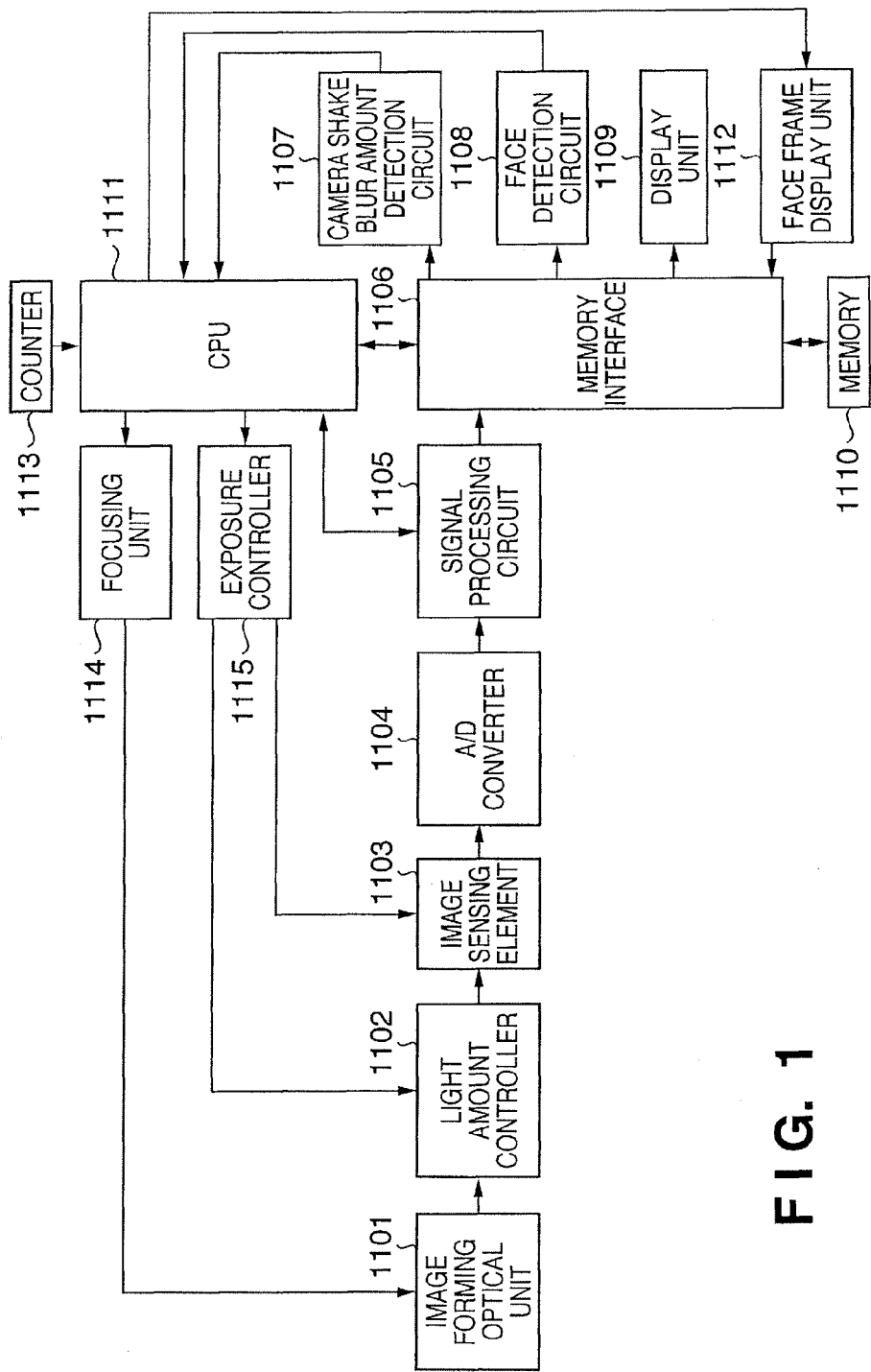
FIG. 1 is a block diagram of an image sensing apparatus of a first embodiment according to the present invention.

FIG. 1 is a block diagram of an image sensing apparatus according to a first embodiment of the present invention.

Referring to FIG. 1, the image sensing apparatus according to the embodiment is, e.g., a digital still camera. An image forming optical unit 1101 forms an incident optical image of an object on an image sensing element 1103 such as a CCD or CMOS sensor. The image sensing element 1103 photoelectrically converts the optical image into an analog electrical signal. A light amount controller 1102 has an aperture stop, and controls the light amount of the object's optical image that reaches the image sensing element 1103. An A/D converter 1104 converts the output electrical signal from the image sensing element 1103 into image data that is a digital signal. A signal processing circuit 1105 has a function of developing the image data received from the A/D converter 1104 into YUV image data made up of luminance data Y and hue data U and V, in order to display the image data on a display screen of, e.g., a liquid crystal display (LCD), or to use the image data in a camera shake blur amount detection circuit 1107 or a face detection circuit 1108. The signal processing circuit 1105 mainly comprises a white balance (WB) circuit, a gamma correction circuit, and a matrix converter.

The signal processing circuit 1105 includes a correction circuit that corrects a camera shake on the basis of information of a camera shake blur amount sent from the camera shake blur amount detection circuit 1107 via a CPU 1111. A memory 1110 temporarily saves the image data continuously output from the signal processing circuit 1105 via a memory interface 1106.

A display unit 1109 reads out the image data that is saved in the memory 1110 via the memory interface 1106, and displays the readout data on the display screen of, e.g., an LCD. The camera shake blur amount detection circuit 1107 calculates the moving amount (hereinafter "the camera shake blur amount") of an image caused by a camera shake from a plurality of image data saved in the memory 1110, and sends information of the camera shake blur amount to the CPU 1111. The camera shake blur amount is detected by first dividing the display screen into a plurality of areas, calculating the local moving amount in each area, and averaging the local moving amounts by statistical processing, thereby calculating the moving amount in the entire display screen.

The face detection circuit 1108 is a feature detection circuit that reads out the image data saved in the memory 1110 via the memory interface 1106, and detects the face area of one or more persons contained in the readout image data. Examples applicable as the face area detection method are the method using eigenfaces obtained by analysis of main components, disclosed in M. A. Turk and A. P. Pentland, "Face recognition using eigenfaces", Proc. of IEEE Conf. on Computer Vision and Pattern Recognition, pp. 586-591, 1991, and the method using feature points such as the eye, nose, and mouth, disclosed in Japanese Patent Laid-Open No. 1997-251534. Each of the detection methods determines whether an object in a sensed image is a person's face by a pattern matching method that matches an input image with a plurality of standard patterns. The embodiment performs the determination by matching standard patterns of persons' faces that are prestored in the memory 1110 with obtained image data. Also, the time that the camera shake blur amount detection circuit 1107 requires to calculate the moving amount of an image is much shorter than the time that the face detection circuit 1108 requires to detect the face area. Note that it is only necessary to recognize a target object by extracting a feature portion from image data. Therefore, the target object is not limited to the face, but may also be an animal, such as a dog or a cat.

The face detection circuit 1108 sends the obtained face detection results to the CPU 1111. On the basis of the face detection results, the CPU 1111 sends data representing the position of an area occupied by each detected face to a face frame display unit 1112. The face frame display unit 1112 generates data of a face frame surrounding the position of each face from the data representing the position of the face, and stores the generated data in the memory 1110 via the memory interface 1106. The display unit 1109 reads out the stored data via the memory interface 1106, and superimposes the face frame on the object's image on the display screen.

A counter 1113 counts the number of times of determination corresponding to small camera shake blur amounts in a procedure shown in FIG. 2 (to be described hereinafter), and sends the count to the CPU 1111.

A focusing unit 1114 drives the position of a focusing lens in the image forming optical unit 1101 in order to control the focusing state of the optical image formed on the image sensing element 1103. An exposure controller 1115 controls the aperture diameter of the aperture stop of the light amount controller 1102, or controls the timing of reset scanning or charge read scanning of the image sensing element 1103, in order to control the light amount of the optical image formed on the image sensing element 1103. When the face detection circuit 1108 detects a face, the focusing unit 1114, the exposure controller 1115, and the WB circuit in the signal processing circuit 1105 respectively perform auto-focusing control, automatic exposure control, and automatic white balance processing, either by using only the face area detected by the face detection circuit 1108, or by weighting an image signal of the face area.

Face Frame Display Process

Figure 2:
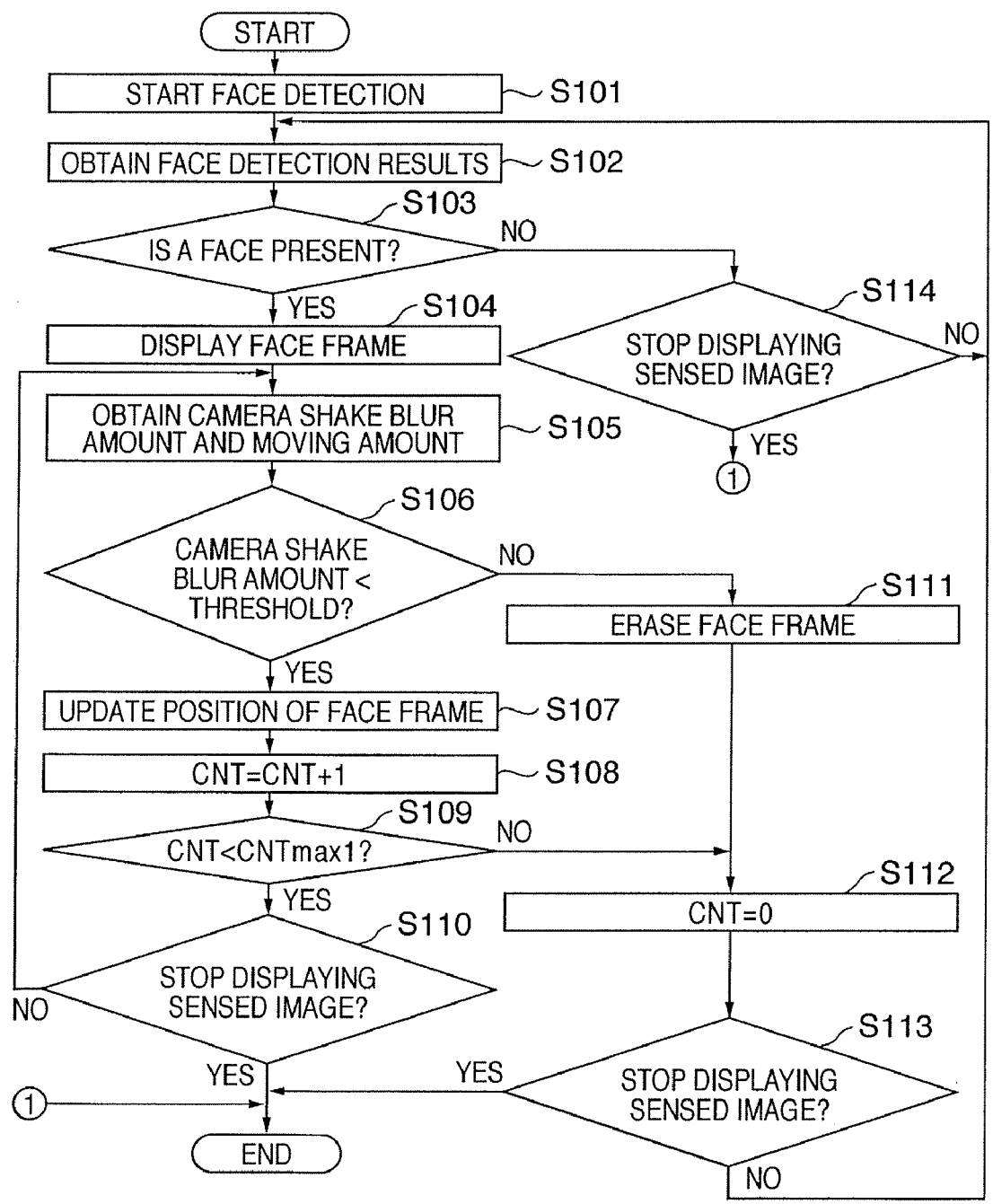
FIG. 2 is a flowchart showing the procedure of displaying a face frame performed by the image sensing apparatus according to the first embodiment.

Following is a description of a face frame display process according to the first embodiment, with reference to FIG. 2.

FIG. 2 is a flowchart showing a procedure of displaying a face frame performed by the image sensing apparatus according to the first embodiment. The image sensing apparatus continuously captures an image of an object, and displays a moving image on the display unit 1109. The display unit 1109 superimposes a face frame in the position of the face of a person in the image.

The CPU 1111 that is shown in FIG. 1 implements the procedure shown in FIG. 2 by executing a face detection program or a display control program. Assume that a counter CNT (to be described hereinafter) is set to zero as an initial value.

In step S101 of FIG. 2, the CPU 1111 causes the face detection circuit 1108 to start the face detection process. The face detection circuit 1108 performs the face detection process by reading out the latest image data saved in the memory 1110. The face detection circuit 1108 performs the face detection process more than once; the face detection circuit 1108 repetitively performs the face detection process in parallel with other steps, and updates the face detection results whenever new face detection results are obtained.

In step S102, the CPU 1111 receives the latest face detection results from the face detection circuit 1108. The face detection results include information indicating the position and size of an area occupied by the detected face.

In step S103, the CPU 1111 determines whether a face is detected. If a face is detected, the process advances to step S104. If no face is detected, the process advances to step S114.

In step S114, the CPU 1111 determines whether to stop displaying the sensed image on the basis of the operation state of the image sensing apparatus, e.g., on the basis of whether a shutter button is pressed or a button for calling a menu list is pressed. For example, if the user has pressed the shutter button in order to record the image (YES in step S114), the CPU 1111 terminates the procedure in order to stop displaying the sensed image and proceed to an image recording operation. On the other hand, if the CPU 1111 determines in step S114 to keep displaying the sensed image (NO in step S114), the process returns to step S102, and the CPU 1111 repeats the process from step S102.

Figure 3A:
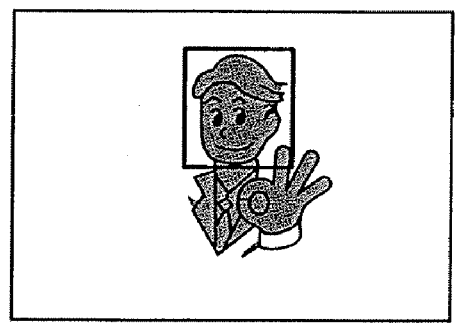
FIGS. 3A to 3F illustrate face frame display examples according to the first embodiment.

In step S104, as shown in FIG. 3A, the CPU 1111 causes the display unit 1109 to superimpose a face frame on the face of the object on the basis of the face detection results.

In step S105, the CPU 1111 acquires the camera shake blur amount and moving amount detected by the camera shake blur amount detection circuit 1107. More specifically, the camera shake blur amount detection circuit 1107 reads out a plurality of image data stored in the memory 1110. By using the luminance signals of the plurality of image data, the camera shake blur amount detection circuit 1107 detects the motion vector of the image in each area (macro block) formed by dividing one image frame into a plurality of portions by using, e.g., the block matching method. The camera shake blur amount detection circuit 1107 separates the motion vector of the background image caused by a camera shake and a motion vector caused by the motion of the object from the motion vector of each macro block, thereby detecting the local moving amount (a motion vector caused by the motion of the object) in the face area of the person.

In step S106, the CPU 1111 compares the camera shake blur amount received from the camera shake blur amount detection circuit 1107 with a threshold to determine whether the camera shake blur amount is less than the threshold. If the CPU 1111 determines in step S106 that the camera shake blur amount is less than the threshold, the process advances to step S107.

Figure 3B:
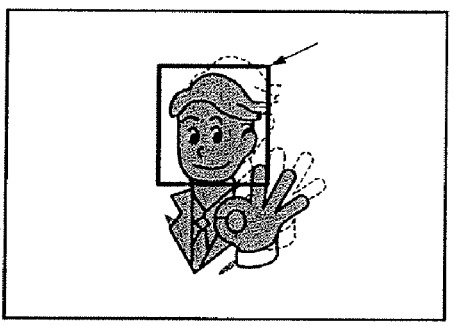
Figure 3C:
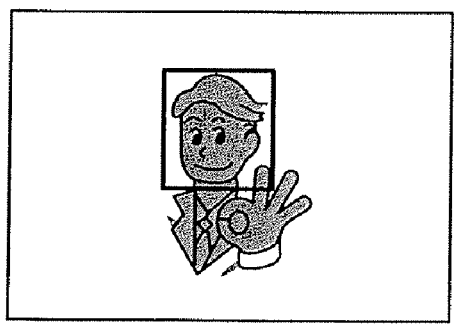
Figure 3D:
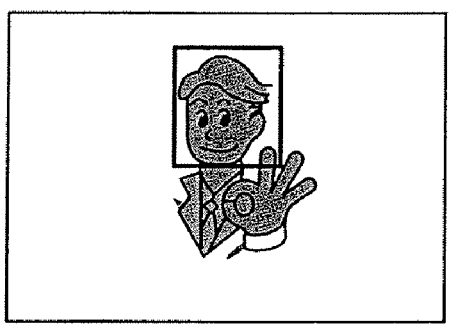

In step S107, the CPU 1111 sends movement information (i.e., shift amount information) of the generated face frame to the face frame display unit 1112 on the basis of the camera shake blur amount and moving amount obtained in step S105. On the basis of the information of the camera shake blur amount and moving amount, the face frame display unit 1112 generates new data representing a face frame surrounding the face position, and stores the data in the memory 1110 via the memory interface 1106. As shown in FIGS. 3B and 3C, the display unit 1109 reads out the stored data via the memory interface 1106, updates the position of the face frame, and displays it on the object image.

In step S108, the counter 1113 increments the counter CNT by 1. Thereafter, 1 is added to the counter CNT whenever the process advances to step S108.

In step S109, the CPU 1111 compares the counter CNT incremented in step S108 with a set value CNTmax1 to determine whether the count has reached the set value CNTmax1.

If the count has not reached the set value CNTmax1, the process advances to step S110, and the CPU 1111 performs the same determination as in step S114 described above. If display of the sensed image is to be stopped, the CPU terminates the procedure. If display of the sensed image is not to be stopped, the process returns to step S105. In step S105, the CPU 1111 reacquires the camera shake blur amount and moving amount detected by the camera shake blur amount detection circuit 106.

On the other hand, if the count has reached the set value CNTmax1, the counter 1113 resets the counter CNT in step S112. In step S113, the CPU 1111 performs the same determination as in step S114. If display of the sensed image is to be stopped, the CPU terminates the procedure. If display of the sensed image is not to be stopped, the process returns to step S102, and the CPU 1111 reacquires the latest face detection results.

The set value CNTmax1 is set such that the time required for the count to reach the set value CNTmax1 by repeating steps S105 to S110 is almost equal to the average time required for the face detection circuit 1108 to perform the face detection process once. That is, during a time period from the time the face detection circuit 1108 detects a face once to the time the face detection circuit 1108 detects a face for the next time, the face frame position is set by using the camera shake blur amount and moving amount. When the next face is detected, however, the face frame position is set on the basis of the position of the newly detected face. Note that the process in step S109 may also simply determine by measurement whether the time equivalent to one face detection process performed by the face detection circuit 1108 has elapsed.

The configuration updates the position of the face frame by using the camera shake blur amount and moving amount. Doing so makes it possible to update the position of the face frame at an interval shorter than the time required for the face detection process. That is, even when fine camera shakes occur, the face frame can follow the position of the face with high responsivity, compared to the case that the position of the face frame is updated by using the face detection results alone.

The description returns to step S106. If the CPU 1111 determines in step S106 that the camera shake blur amount obtained in step S105 is equal to or larger than the threshold, the process advances to step S111. The reliability of the position of the new face frame calculated by using the camera shake blur amount and moving amount acquired from the camera shake blur amount detection circuit 1107 presumably decreases as the camera shake blur amount increases. That is, this threshold is set as a reference value for judging the reliability of the camera shake blur amount. The threshold of the camera shake blur amount can be experimentally obtained, and preset as a parameter in the CPU 1111.

Figure 3E:
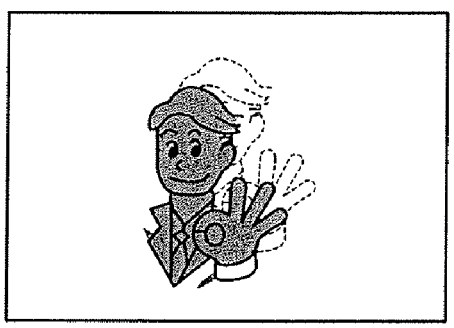
Figure 3F:
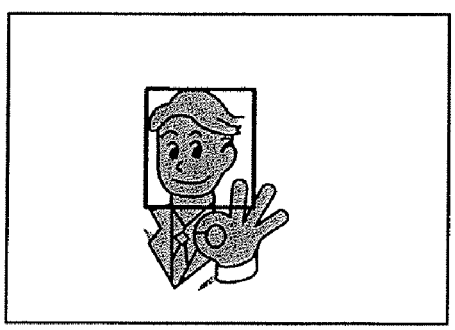

In step S111, the CPU 1111 causes the display unit 1109 to erase the face frame as shown in FIG. 3E. This is so because the camera shake blur amount has reached the threshold, thus making it impossible to obtain a reliable face position even by using the camera shake blur amount and moving amount obtained from the camera shake blur amount detection circuit 1107. The threshold of the camera shake blur amount can be experimentally obtained. After erasing the face frame, the CPU 1111 returns to step S102 via steps S112 and S113, or terminates the process. When returning to step S102, the CPU 1111 acquires new face detection results, and sets a new face frame in a position corresponding to the new face detection results as shown in FIG. 3F.

In the foregoing procedure, when a face is detected, the face frame is moved (i.e., shifted) on the basis of the camera shake blur amount and moving amount until a new face is detected, if the camera shake blur amount is smaller than the threshold, i.e., the process of repeating steps S105 to S110, and the process of returning from step S109 to step S102 via steps S112 and S113. If a camera shake blur amount exceeding the threshold is detected, the displayed face frame is erased, and another face frame is displayed by using new face detection results, i.e., the process of returning from step S106 to step S102 via steps S111, S112, and S113.

Accordingly, the embodiment can increase the face frame tracking responsivity compared to the case that the position of the face frame is set by using only the face detection results obtained by the face detection circuit 1108. In addition, in the state in which the face frame is highly likely to deviate, the face frame is erased regardless of the face detection results. This makes it possible to prevent the face frame from being superposed in an unnatural position other than the face.

Note that the threshold used in step S106 may also be changed in accordance with the size of the face obtained in step S102. Even with an identical camera shake blur amount, a large face frame is set for a large face, and thus, the possibility that the face frame falls outside the face in the image decreases, but a small face frame is set for a small face, which increases the possibility that the face frame falls outside the face in the image. Therefore, it is also possible to increase the threshold, if a detected face is large, in order to reduce the possibility that the face frame is erased, and decrease the threshold, if a detected face is small, in order to reduce the possibility that the face frame is superimposed in a position other than the face.

The same effect can also be obtained by replacing the processing using the foregoing camera shake blur amount and the moving amount with a process that uses the camera shake blur amount alone.

Furthermore, any apparatus capable of performing the face detection process on an input moving image and detecting camera shake information from a plurality of image data can execute the embodiment, even when the apparatus is a personal computer or the like having an image processing function.

Second Embodiment

Figure 4:
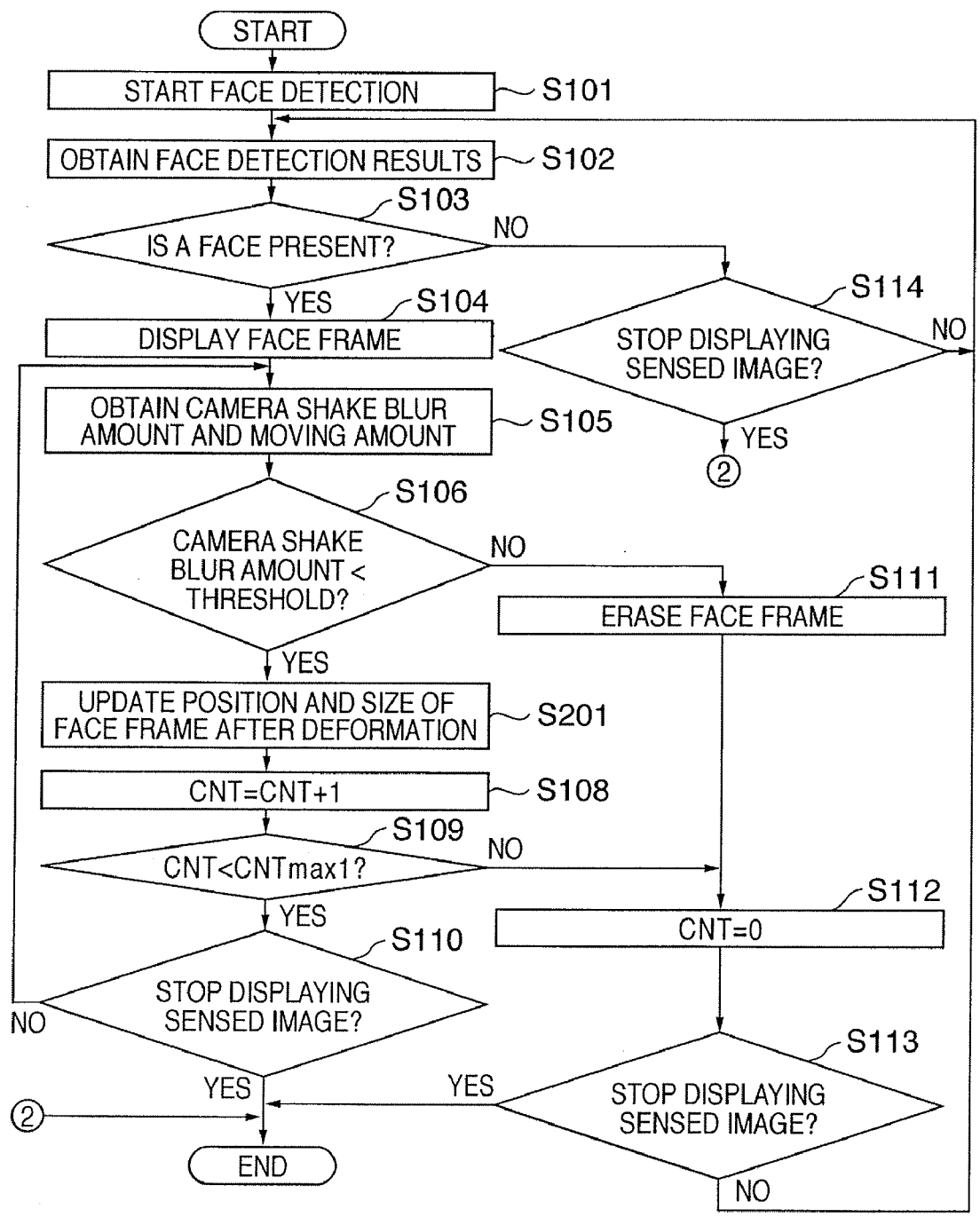
FIG. 4 is a flowchart showing the procedure of displaying a face frame performed by an image sensing apparatus according to a second embodiment.

A face frame display process according to a second embodiment will be explained below with reference to a flowchart shown in FIG. 4.

The second embodiment makes the display form of a face frame when moving it on the basis of the camera shake blur amount and moving amount different from that of a face frame when moving it on the basis of the face detection results.

Note that a configuration of an image sensing apparatus according to the second embodiment is the same as the block diagram shown in FIG. 1, so a repetitive description will be omitted. Only the portion of the flowchart shown in FIG. 4 that is different from the flowchart shown in FIG. 2 will be described hereinafter.

The difference of the embodiment from the first embodiment is a method by which a face frame display unit 1112 generates new data that represents a face frame surrounding the position of a face, on the basis of information of the camera shake blur amount and the moving amount.

Figure 5A:
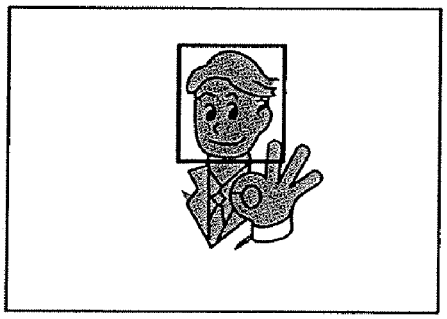
FIGS. 5A to 5F illustrate face frame display examples according to the second embodiment.

If a CPU 1111 determines in step S106 that the camera shake blur amount is less than a threshold, the flow advances to step S201. In step S201, the CPU 1111 temporarily stores, in a memory 1110, via a memory interface 1106, a face frame generated on the basis of the camera shake information by the face frame display unit 1112 as information having a size different from a face frame generated on the basis of the face detection results in step S104. More specifically, the CPU 1111 forms data of a face frame including both an area, in FIG. 5A, occupied by the face frame already displayed when the process has reached step S201, and a face area, in FIG. 5C, estimated on the basis of the camera shake blur amount and moving amount acquired in step S105. A display unit 1109 reads out the face frame data from the memory 1110, updates the position and size of the face frame, and superposes the updated face frame on the object image, in FIG. 5B. The face frame is displayed only momentarily. Immediately thereafter, the CPU 1111 forms data of a face frame based on only the face area, in FIG. 5C, estimated on the basis of the camera shake blur amount and moving amount, and the display unit 1109 updates the position and size of the face frame.

Per the foregoing, when updating the position of the face frame by the camera shake blur amount and moving amount, the embodiment once displays a face frame including both a face frame before the position is updated and a face frame after the position is updated, and updates the position of the face frame. This makes it possible to visually emphasize the way the face frame tracks the face.

Figure 5D:
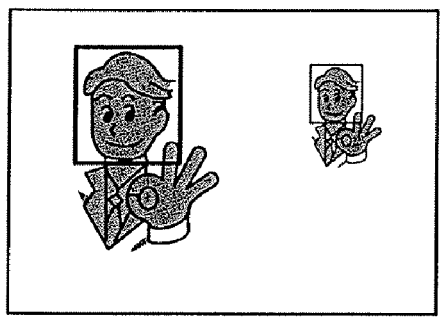
Figure 5B:
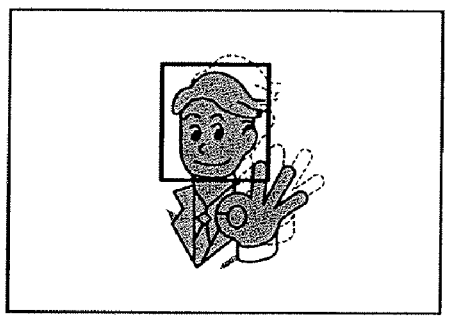
Figure 5E:
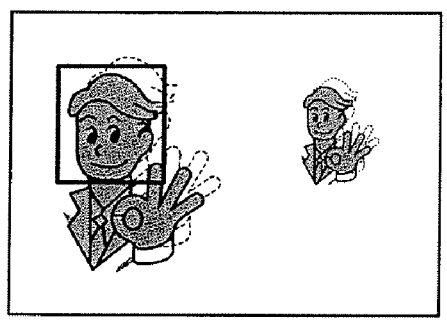
Figure 5C:
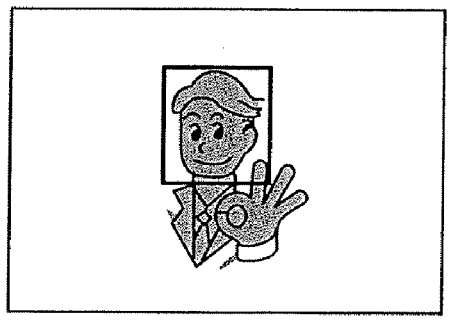
Figure 5F:
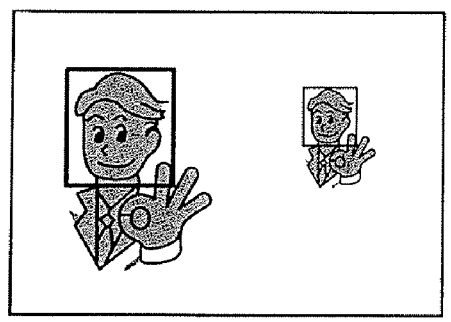

As shown in FIGS. 5D to 5F, it is also possible to use different face frame display forms when updating the position of the face frame by using the camera shake blur amount, and when updating the position of the face frame by using the face detection results from the face detection circuit 1108. Referring to FIGS. 5D to 5F, the position of the face frame of an object on the left side is updated by using the camera shake blur amount and moving amount, and the face frame position is updated after enlarging the face frame once. On the other hand, the position of the face frame of an object on the right side in FIGS. 5D to 5F is updated by using the face detection results from the face detection circuit 1108 without enlarging the face frame. Different colors may also be used as the face frames. Furthermore, the processing using the camera shake blur amount and moving amount explained above may also be replaced with processing using the camera shake blur amount alone.

Third Embodiment

Figure 6:
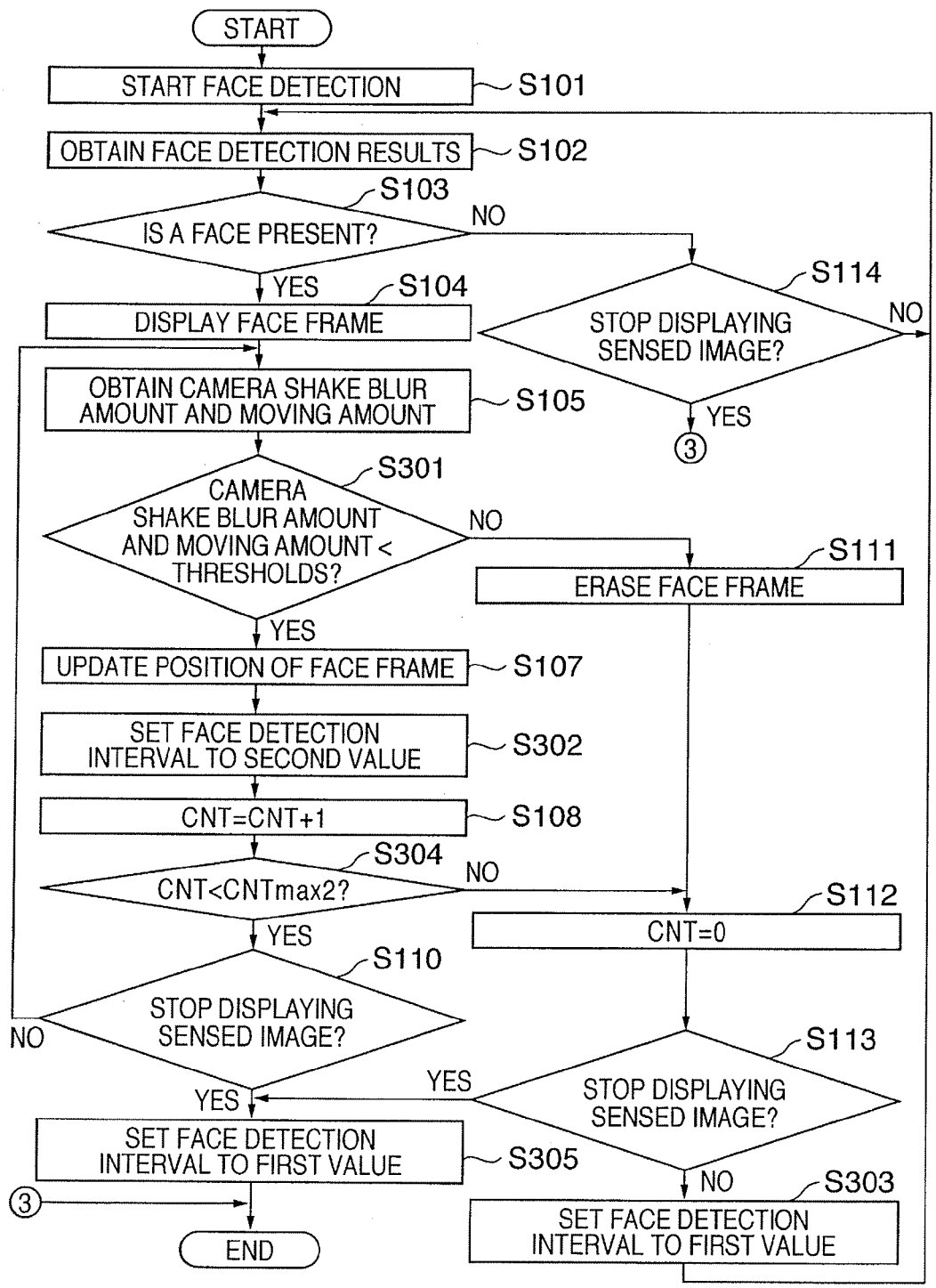
FIG. 6 is a flowchart showing a procedure of displaying a face frame performed by an image sensing apparatus according to a third embodiment.

Following is a face frame display process according to a third embodiment, with reference to a flowchart shown in FIG. 6.

The third embodiment prolongs the execution interval of a face detection process performed by a face detection circuit 1108, while a face frame is shifted on the basis of the camera shake blur amount and moving amount.

Note that a configuration of an image sensing apparatus according to the third embodiment is the same as the block diagram shown in FIG. 1, and thus, a repetitive description will be omitted. Only the portion of the flowchart shown in FIG. 6 that is different from the flowchart shown in FIG. 2 will be described hereinafter.

The embodiment changes the execution interval of the face detection process performed in parallel with the process of moving the position of a face frame, in accordance with whether the face frame position is moved by using information of the camera shake blur amount and moving amount.

First, in step S104 of FIG. 6, a CPU 1111 causes a display unit 1109 to superimpose a face frame on the face of an object on the basis of the face detection results. In step S105, the CPU 1111 obtains the camera shake blur amount and the moving amount detected by a camera shake blur amount detection circuit 1107.

In step S301, the CPU 1111 compares the camera shake blur amount and the moving amount received from the camera shake blur amount detection circuit 1107 with each respective threshold, thereby determining whether both the camera shake blur amount and the moving amount are less than the thresholds. If both the camera shake blur amount and the moving amount are less than the thresholds, the process advances to step S107, and a face frame display unit 1112 updates the position of the face frame on the basis of information of the camera shake blur amount and the moving amount.

In step S302, the CPU 1111 sets the execution interval of the face detection process of the face detection circuit 1108 to a second value, which is larger than a first value, as an initial value. The reason is that if both the camera shake blur amount and the moving amount are less than each respective threshold in step S301, the CPU 1111 regards the image as a scene in which the moving amount of the object is small, and decreases the execution frequency of the face detection process. The CPU 1111 skips the step if the execution interval of the face detection process is already set at the second value by repeating steps S105 to S110.

In step S108, a counter 1113 increments a counter CNT by 1, and the process advances to step S304, wherein the CPU 1111 compares the counter CNT incremented in step S108 with a set value CNTmax2. If the count is smaller than the set value CNTmax 2, the process advances to step S110; if not, the process advances to step S112.

The set value CNTmax 2 is set such that, while the execution interval of the face detection process is set at the second value, the time required for the count to reach the set value CNTmax2 by repeating steps S105 to S110 is almost equal to the average time required for the face detection circuit 107 to perform the face detection process once.

If the CPU 1111 determines in step S110 that the display of the sensed image is to be stopped, the process advances to step S305, wherein the CPU 1111 returns the execution interval of the face detection process to the first value as the initial value, and terminates the procedure.

On the other hand, if at least one of the camera shake blur amount and moving amount is equal to or larger than the threshold in step S301, the process advances to step S303 via steps S111, S112, and S113.

In step S303, the CPU 1111 sets the execution interval of the face detection process of the face detection circuit 1108 to the first value as the initial value. The reason is that, if at least one of the camera shake blur amount and the moving amount is greater than equal to than the threshold in step S301, the CPU 1111 regards the image as a scene in which the moving amount of the object is large, and increases the execution frequency of the face detection process.

Also, if the count has reached the set value CNTmax 2 in step S304, the process advances to step S303 via steps S111, S112, and S113, and the CPU 1111 sets the execution interval of the face detection process of the face detection circuit 1108 to the first value as the initial value.

Per the foregoing, when the moving amount of an object is small, and the face frame can track the movement of the face by using the camera shake blur amount and the moving amount, the power consumption in the face detection circuit 1108 can be reduced by lowering the execution frequency of the face detection process. Note that the processing using the camera shake blur amount and the moving amount may also be replaced with a process using the camera shake blur amount alone.

Fourth Embodiment

Figure 7:
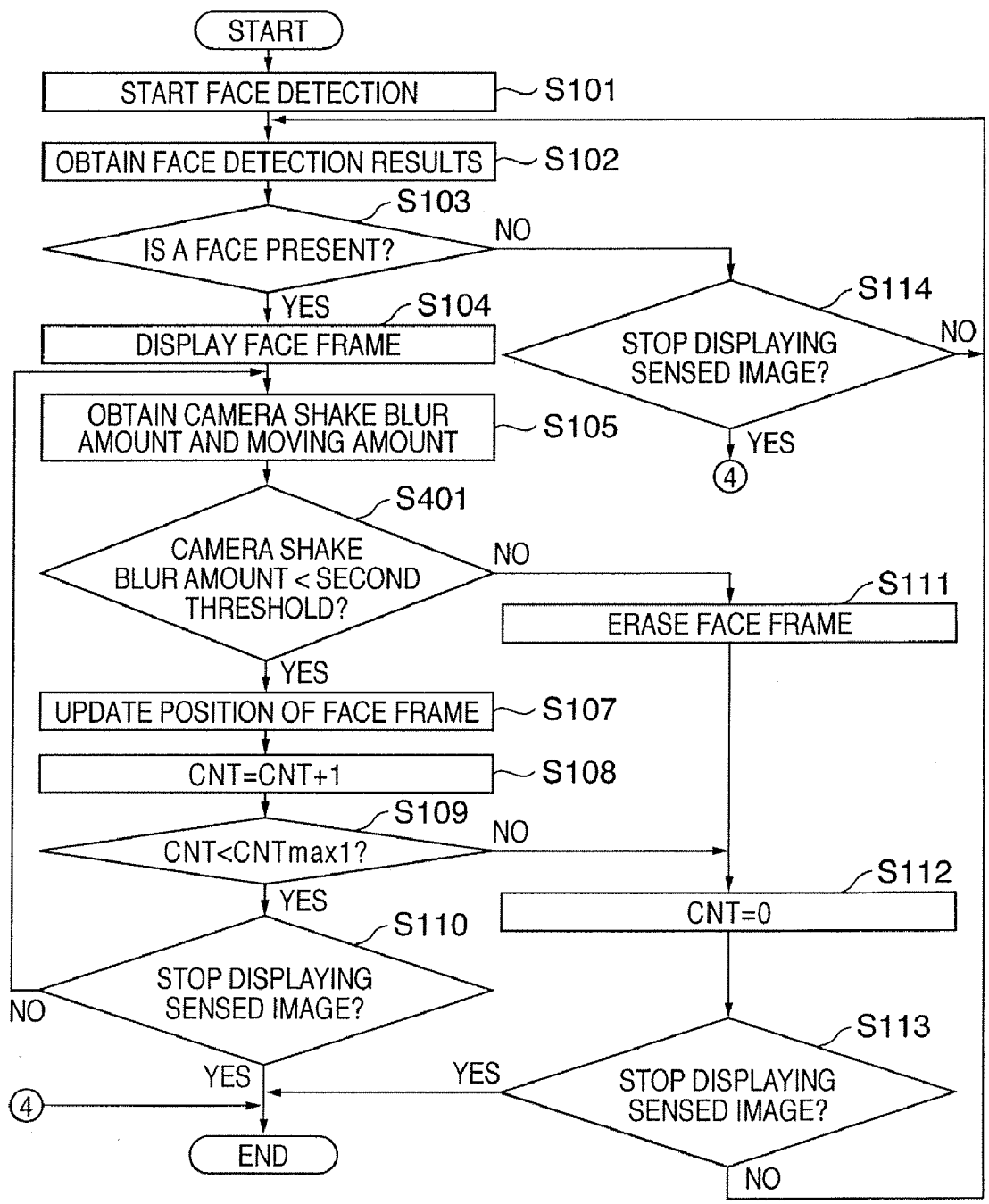
FIG. 7 is a flowchart showing the procedure of displaying a face frame performed by an image sensing apparatus according to a fourth embodiment.

Following is a description of a face frame display process according to a fourth embodiment, with reference to a flowchart shown in FIG. 7.

The fourth embodiment differs from the first embodiment in that, even if the camera shake blur amount is less than a threshold, a face frame is not moved on the basis of the camera shake blur amount and the moving amount.

Note that a configuration of an image sensing apparatus according to the fourth embodiment is the same as the block diagram shown in FIG. 1, and thus, a repetitive description will be omitted. Only the portion of the flowchart shown in FIG. 7 that is different from the flowchart shown in FIG. 2 will be described hereinafter.

First, in step S104 of FIG. 7, a CPU 1111 causes a display unit 1109 to superimpose a face frame on the face of an object on the basis of the face detection results. Note that the detected face is positioned in the center of the face frame, and the face frame is a size larger than the face area by one level.

In step S105, the CPU 1111 obtains the camera shake blur amount detected by a camera shake blur amount detection circuit 1107.

In step S401, the CPU 1111 compares the camera shake blur amount received from the camera shake blur amount detection circuit 1107 with a second threshold, and determines whether the camera shake blur amount is less than the second threshold, which is set such that the face position acquired in step S102 stays inside the face frame set in step S104, even if the face position moves by a camera shake. That is, if the camera shake blur amount is less than the second threshold in step S401, the CPU 1111 can determine that the face does not come out of the already displayed face frame. The central position of the face in the face frame moves whenever a camera shake occurs. However, when the camera shake occurs a plurality of times, the face positional differences produced by the individual camera shakes presumably cancel out each other.

In step S108, a counter 1113 increments a counter CNT by 1. In step S109, the CPU 1111 compares the counter CNT incremented in step S108 with a set value CNTmax 1, to determine whether the count is larger than the set value CNTmax1. If the count has not reached the set value CNTmax1, the CPU 1111 determines that a face detection circuit 1108 has not detected any new face yet, and the process advances to step S110. If the count has reached the set value CNTmax1, the CPU 1111 determines that the face detection circuit 1108 has detected a new face, and the process advances to step S112.

Per the foregoing, the procedure erases the face frame by determining that the face has come out of the face frame if the detected camera shake is greater than or equal to the second threshold, and keeps displaying the face frame by determining that the face stays inside the face frame if the detected camera shake is less than the second threshold.

Accordingly, the embodiment determines the position of the face frame in accordance with the face detection results from the face detection circuit 1108, but erases the face frame regardless of the face detection results if a large camera shake blur amount is detected. Thus, it is effectively possible to prevent the face frame from being kept displayed with the face falling outside the face frame.

Fifth Embodiment

Figure 8:
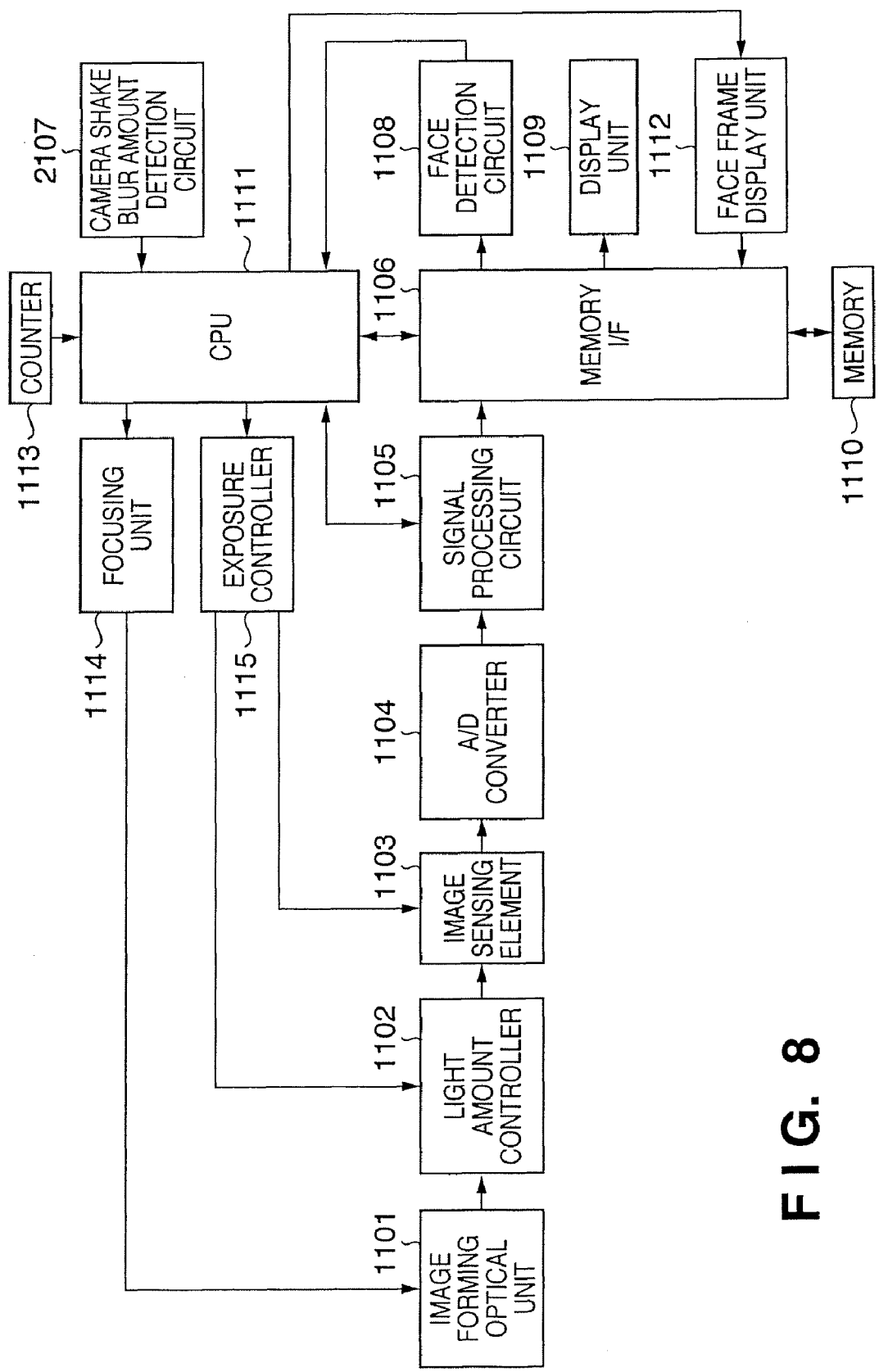
FIG. 8 is a block diagram of an image sensing apparatus according to a fifth embodiment of the present invention.

Following is a description of a configuration of an image sensing apparatus according to a fifth embodiment, with reference to FIG. 8.

FIG. 8 is a block diagram showing the configuration of the image sensing apparatus according to the fifth embodiment. The same reference numerals as in FIG. 1 denote the same parts in FIG. 8.

The image sensing apparatus according to the fifth embodiment detects a camera shake blur amount, not from image data, but from a mechanical device such as an acceleration detector or gyro, and calculates the moving amount of a face frame on the basis of the detected camera shake blur amount.

Note that any of the first to fourth embodiments is applicable as a face frame display process performed by the image sensing apparatus according to the embodiment, and thus, a repetitive description will be omitted.

According to the first embodiment, the camera shake blur amount detection circuit 1107 detects the motion vector of an image, by using a plurality of image data successively acquired and stored in the memory 1110. By contrast, a camera shake blur amount detection circuit 2107 according to the embodiment includes a blur detector, such as an acceleration sensor or a gyro. The detector detects the moving amount, the moving direction, the rotational amount, and the rotational direction of the image sensing apparatus that is caused by a camera shake. The camera shake blur amount detection circuit 2107 transmits the camera shake information indicating the obtained moving amount, the moving direction, the rotational amount, and the rotational direction of the image sensing apparatus to a CPU 1111.

Figure 9A:
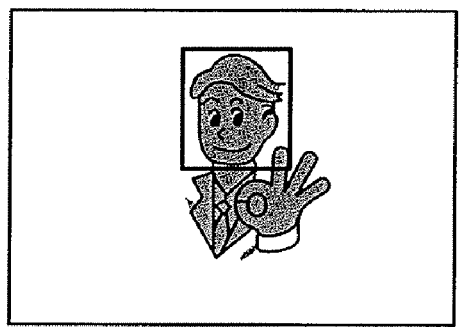
FIGS. 9A to 9C illustrate face frame display examples according to the fifth embodiment.
Figure 9A:
Figure 9B:
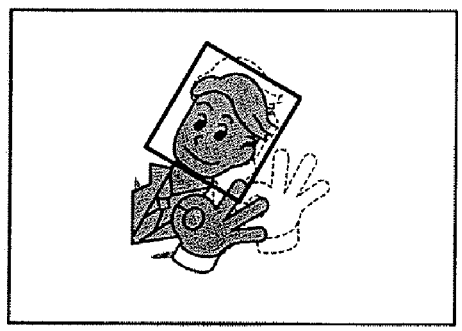
Figure 9B:
Figure 9C:
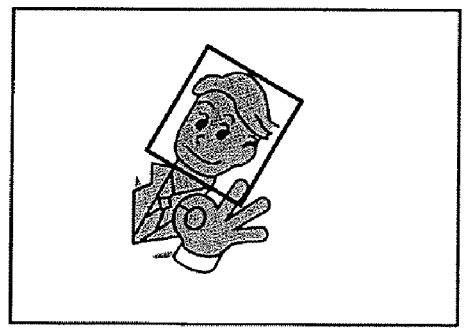
Figure 10A:
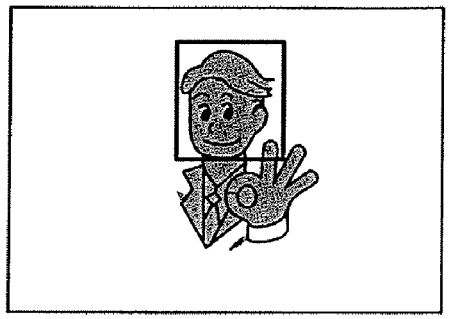
FIGS. 10A to 10C illustrate face frame display examples in prior art.
Figure 10A:
Figure 10B:
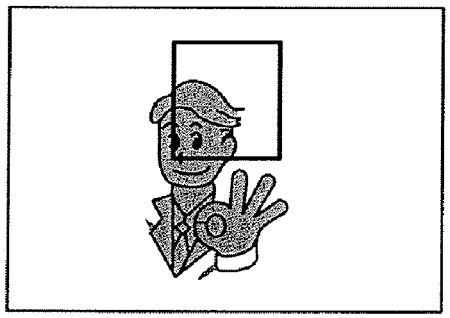
Figure 10B:
Figure 10C:
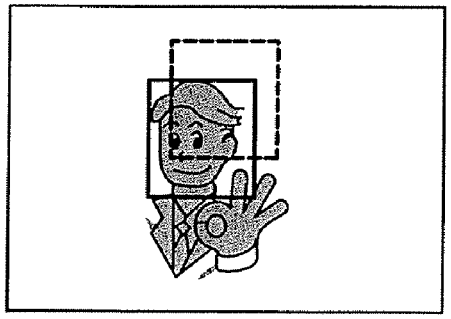

The CPU 1111 sends the camera shake information as movement information and rotation information of a face frame to a face frame display unit 1112. The face frame display unit 1112 generates data representing the position of the face frame on he basis of the movement information and rotation information, and stores the data in a memory 1110 via a memory interface 1106. A display unit 1109 reads out the stored data via the memory interface 1106. As shown in FIGS. 9A to 9C, the display unit 1109 superimposes the face frame on the image in accordance with the direction and position of the face of the object on the display screen.

The embodiment can generate the camera shake information by using the detection results from, e.g., the acceleration sensor or the gyro, and shift the position of the face frame or determine whether to erase the face frame by using the camera shake information.

Accordingly, in addition to the effect of the first embodiment, the camera shake information can be generated even when the image sensing apparatus rotates by a camera shake. It is thus possible to reduce the load on the calculation by the CPU, and decrease the circuit scale.

Other Embodiments

The present invention can also be achieved by supplying a computer program that implements the functions of the embodiments to a system or apparatus, either directly or remotely. In such a circumstance, a computer of the system or the like loads and executes the computer program.

Accordingly, the computer program itself that is installed in a computer to implement the functional processing of the present invention by the computer also implements the present invention.

In such a circumstance, the computer program can take any form as long as it has the function of a program. Examples are an object code, a program executed by an interpreter, and script data to be supplied to an OS.

Examples of a recording medium (storage medium) for supplying the program are a flexible disk, hard disk, optical disk, and magnetooptical disk. Other examples are an MO, CD-ROM, CD-R, CD-RW, magnetic tape, nonvolatile memory card, ROM, and DVD (DVD-ROM and DVD-R).

The program can also be supplied by connecting to an Internet website by using a browser of a client computer, and downloading the computer program of the present invention itself from the website, or by downloading a compressed file, including an automatic installation function, to a recording medium such as a hard drive. It is also possible to divide the computer program forming the program of the present invention into a plurality of files, and download the individual files from different websites. That is, the present invention also includes a WWW server that allows a plurality of users to download program files for implementing the functional processing of the present invention by a computer.

Furthermore, it is possible to encrypt the program of the present invention, distribute the encrypted program to users by storing the program in a storage medium such as a CD-ROM, and allow a user who has satisfied a predetermined condition to download key information for decryption from a website, over the Internet. In such a circumstance, the user implements the functional processing of the present invention by executing the encrypted program by using the downloaded key information, and installing the program in a computer.

The functions of the embodiments are implemented by executing the readout program by a computer as per the foregoing, and can also be implemented by allowing an OS or the like running on the computer to perform part or the whole of actual processing on the basis of instructions by the program.

It is further possible to implement the functions of the embodiments by writing the program that is read out from the recording medium to a memory of a function expansion board inserted into the computer or in a memory of a function expansion unit connected to the computer, and performing part or the whole of actual processing by a CPU or the like of the board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-165365, filed Jun. 14, 2006, 2006-211051, filed Aug. 2, 2006 and 2007-129798, filed May 15, 2007, which are hereby incorporated by reference herein in their entirety.

What is claimed is:

1. An image processing apparatus comprising:
a feature detection circuit adapted to detect a feature portion of an object from a sensed image;
a blur amount detection circuit adapted to detect a blur amount of a device adapted to obtain the sensed image;
a display unit adapted to display the sensed image, and to display a frame surrounding the feature portion of the object in the displayed sensed image; and
a calculation circuit adapted to set a position, in the sensed image, of the frame surrounding the feature portion of the object,
wherein said blur amount detection circuit detects the blur amount more than once during the time period that said feature detection circuit detects the feature portion of an object once,
wherein said calculation circuit sets the position of the frame using the detected feature portion of the object when the feature detection circuit detects the feature portion of the object from the sensed image, and sets the position of the frame using the detected blur amount when the feature detection circuit does not detect the feature portion of the object from the sensed image, and
wherein said display unit displays the frame on the sensed image in accordance with the position of the frame set by said calculation unit.

2. The apparatus according to claim 1, wherein if the blur amount is smaller than a threshold, said calculation circuit calculates the shift amount of the frame on the basis of the blur amount.

3. The apparatus according to claim 2, wherein if the blur amount is not smaller than the threshold, said calculation circuit does not calculate the shift amount of the frame on the basis of the blur amount.

4. The apparatus according to claim 3, wherein if the blur amount is not smaller than the threshold, said calculation circuit sets a new position of the frame on the basis of the feature portion detected by said feature detection circuit.

5. The apparatus according to claim 1, wherein said feature portion detection circuit prolongs an interval of the process of detecting the feature portion of the object from the sensed image while said calculation circuit is calculating the shift amount of the frame on the basis of the blur amount, compared to a case where said calculation circuit does not calculate the shift amount of the frame on the basis of the blur amount.

6. The apparatus according to claim 1, wherein said display unit displays the frame in a different form when the position of the frame shifts on the basis of the feature portion detected by said feature detection circuit, than when the position of the frame shifts on the basis of the blur amount.

7. The apparatus according to claim 1,
wherein said display unit erases the frame if the blur amount detected by said blur amount detection circuit is not less than a threshold.

8. The apparatus according to claim 7, wherein if said display unit erases the frame because the blur amount detected by said blur amount detection circuit is not less than the threshold, said calculation circuit calculates a new position of the frame on the basis of the feature portion detected by said feature detection circuit.

9. An image sensing apparatus comprising:
an image sensing unit;
a feature detection circuit adapted to detect a feature portion of an object from a sensed image obtained by said image sensing unit;
a blur amount detection circuit adapted to detect a blur amount of the image sensing apparatus;
a display unit adapted to display the sensed image, and to display a frame surrounding the feature portion of the object in the displayed sensed image; and
a calculation circuit adapted to set a position, in the sensed image, of the frame surrounding the feature portion of the object,
wherein said blur amount detection circuit detects the blur amount more than once during the time period that said feature detection circuit detects the feature portion of an object once,
wherein said calculation circuit sets the position of the frame using the detected feature portion of the object when the feature detection circuit detects the feature portion of the object from the sensed image, and sets the position of the frame using the detected blur amount when the feature detection circuit does not detect the feature portion of the object from the sensed image, and
wherein said display unit displays the frame on the sensed image in accordance with the position of the frame set by said calculation unit.

10. The apparatus according to claim 9, wherein said blur amount detection circuit is one of an acceleration sensor and a gyro.

11. The apparatus according to claim 1,
wherein said display unit erases the frame if the blur amount detected by said blur amount detection circuit is not less than a threshold.

12. The apparatus according to claim 11, wherein said blur amount detection circuit is one of an acceleration sensor and a gyro.

13. A control method of an image processing apparatus comprising a feature detection circuit adapted to detect a feature portion of an object from a sensed image, and a display unit adapted to display the sensed image, and to display a frame surrounding the feature portion of the object in the displayed sensed image, the method comprising the steps of:

detecting a blur amount, of a device adapted to obtain the sensed image;

setting a position, in the sensed image, of the frame surrounding the feature portion of the object, on the basis of the feature portion detected by the feature detection circuit, and displaying the frame; and calculating, on the basis of the blur amount, a shift amount of the frame whose position in the sensed image is set on the basis of the feature portion detected by the feature detection circuit, and displaying the frame;

wherein said detecting step detects the blur amount more than once during the time period that the feature detection circuit detects the feature portion of an object once, wherein said calculating step sets the position of the frame using the detected feature portion of the object when the feature detection circuit detects the feature portion of the object from the sensed image, and sets the position of the frame using the detected blur amount when the feature detection circuit does not detect the feature portion of the object from the sensed image, and wherein the display unit displays the frame on the sensed image in accordance with the position of the frame set in said calculating step.

* * * * *